United States Patent [19]

O'Brien et al.

[11] Patent Number: 4,459,726
[45] Date of Patent: Jul. 17, 1984

[54] TEMPERATURE CONTROL FOR SHELL TYPE ROLLS

[75] Inventors: Robert D. O'Brien; Elizabeth C. Schmecker, both of Seymour, Conn.

[73] Assignee: USM Corporation, Farmington, Conn.

[21] Appl. No.: 332,481

[22] Filed: Dec. 21, 1981

[51] Int. Cl.³ ............................................. B21B 13/02
[52] U.S. Cl. ................................. 29/116 AD; 29/129; 165/89
[58] Field of Search ............. 29/116 R, 116 AD, 123, 29/129; 165/89, 90

[56] References Cited

U.S. PATENT DOCUMENTS

Re. 27,445  8/1972  Kuehn ................................ 29/116 R
3,965,974   6/1976  Sernetz et al. ................. 29/116 R X
4,077,466   3/1978  Fleissner ............................... 165/89

FOREIGN PATENT DOCUMENTS 1000235  8/1965  United Kingdom ................. 165/90

Primary Examiner—Mark Rosenbaum
Assistant Examiner—Timothy V. Eley
Attorney, Agent, or Firm—Vincent A. White

[57] ABSTRACT

Temperature control means for a deflectable shell roll having lengthwise passages and being mounted for rotation on a fixed beam received in the inner race of a triple race bearing. The middle race of the bearing rotates with the shell roll and provides conduits between the roll shell passages and a central axial bore communicating with a rotary joint providing an inlet and an outlet for circulation of temperature control fluid through the shell passages.

8 Claims, 5 Drawing Figures

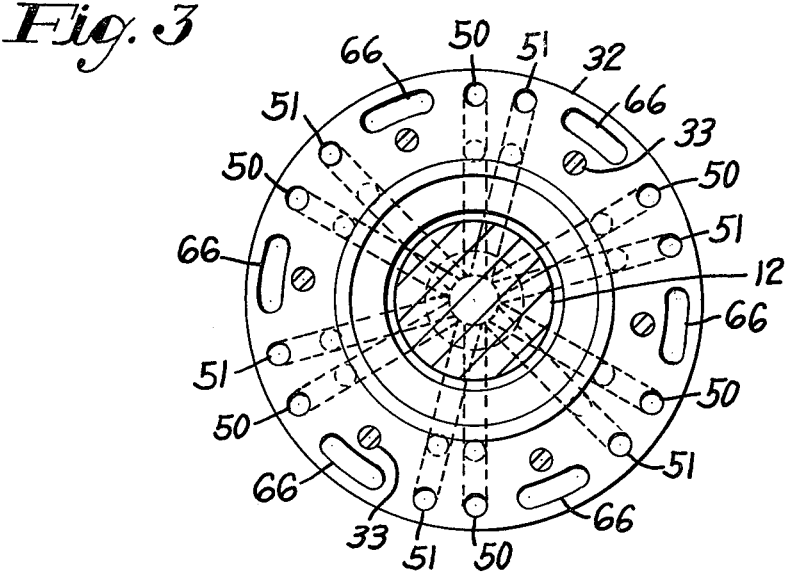
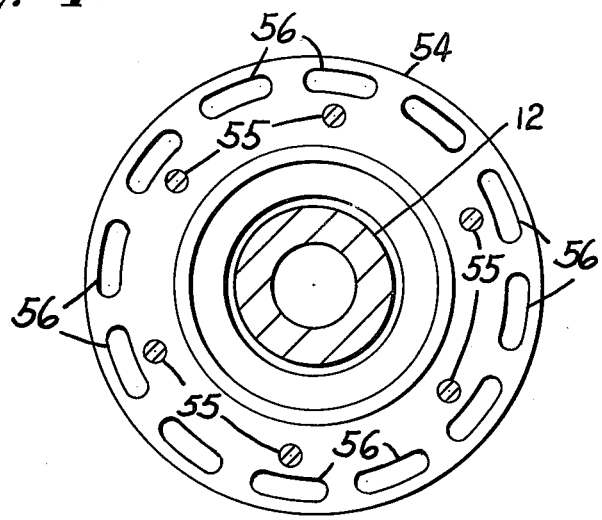
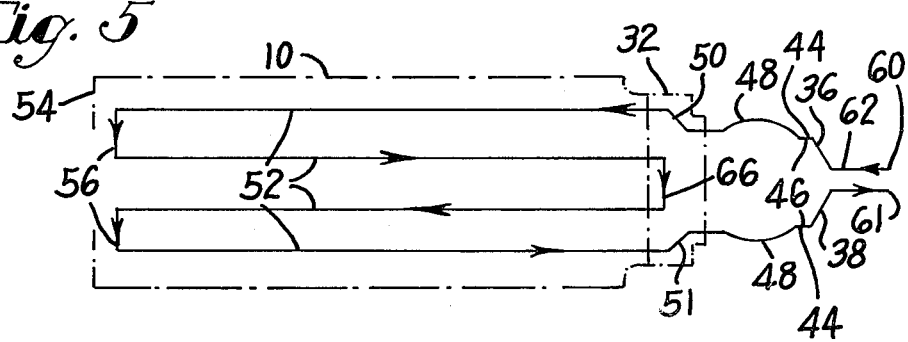

TEMPERATURE CONTROL FOR SHELL TYPE ROLLS

BACKGROUND OF THE INVENTION

1. Field of the Invention

This invention relates to rolls for calendars or like machines in which the temperature of the roll is controlled by circulating heating or cooling fluid.

2. Description of the Prior Art

It is known to provide passages drilled, or otherwise formed, along the length of a roll in a circular pattern underlying the working surface with cross passages at opposite ends of the roll connecting adjacent lengthwise passages to direct temperature control fluid back and forth. The fluid usually enters a central bore of the roll through a suitable stuffing box or rotary joint at one end of the roll and is distributed to certain lengthwise passages. The fluid is redirected back through adjacent passages and may make several passes back and forth before being redirected through the same end of the roll. By suitable baffles the fluid is directed through an outlet of the same stuffing box. A typical roll of this type is shown in U.S. Pat. No. 2,890,026 to Marganski et al.

The advantages of such temperature controlled rolls are well known and include the ability to provide a precisely controllable high rate of heat transfer between the surface of the working roll and material being processed. This results in a more efficient roll operation and provides a higher degree of smoothness and gloss when used in a paper calendar for example.

There has been developed a controlled deflection roll of the type having a fixed beam on which is rotatably mounted a hollow shell roll. Fluid support means are provided between the beam and the inner surface of the shell. When a load is applied to the working surface of the shell such as in a calendar, the fixed beam is deflected while the support means maintains the nip between outer working surface of the shell roll and a counter roll substantially constant along the length of the rolls. One such typical roll is shown in U.S. Pat. No. 2,908,964 to Appenzeller. As therein shown a chamber of pressurized fluid between a fixed beam and the shell at the nip line provides the support. In U.S. Pat. No. 3,587,152 to Hold a plurality of pistons are mounted in the fixed beam and through hydrostatic pads on the pistons support the shell roll. Such rolls are achieving wide acceptance since precise nip pressure control can be achieved in a single roll for a variety of uses where it was the usual practice to dedicate a single roll having a particular crown for each application adapted to accommodate deflection of the roll under a single load condition.

It has been desired to apply the advantages of heated rolls to such shell type rolls. To this end heated fluid has been applied to the inside surface of the shell roll of the type disclosed in the Hold patent by using grooved plates on the ends of pistons mounted in the fixed beam. Such a heat control is disclosed in U.S. Pat. No. 3,997,953 to Christ et al. In U.S. Pat. Nos. 4,282,638 and 4,282,639 to Christ et al there are disclosed means for spraying heated fluid on the inside of the roll shells of the types disclosed in both the Hold and Appenzeller patents. However, the heating or cooling temperature must be transmitted through the thickness of the shell to the work and it has been difficult to maintain the precise temperature control available in the drilled roll of the Marganski patent. Up to now it has been impractical to provide temperature regulating fluid to drilled passages in the roll shell.

It is, therefore, an object of the present invention to provide a means of conducting a temperature control fluid to and from drilled passages in a rotatable shell roll from a rotary joint arranged at the axis of rotation of the shell.

SUMMARY OF THE INVENTION

To achieve the object of the invention the fixed beam has the shell type roll rotatably mounted thereon by spherical bearings. One end of the fixed beam is mounted in the inner race of a triple race bearing having spherical bearings to permit bending of the beam. A middle race of the bearing mounted for rotation thereon has a circular arrangement of conduits extending therethrough parallel to the axis. The middle race is mounted for rotation in a pedestal supporting the roll assembly. A cap attached to one side of the middle race has passages which converge into a central bore of a cylindrical portion having at one end a rotary joint providing inlets and outlets to and from the central bore. The roll shell has passages extending lengthwise through the shell and arranged in a circular pattern underlying the outer working surface of the shell. A cap at the end of the shell facing the triple race bearing has cross passages connecting ends of adjacent lengthwise passages and conduits leading to and from the ends of certain unconnected lengthwise passages. The passages in the shell cap may be connected by flexible tubes to the ends of the passages in the middle race. The middle race and the shell are connected so as to rotate in unison. In this manner, temperature control fluid enters through the inlet of the rotary joint and through suitable baffles is directed through the cap and middle race and through the flexible tubes to certain lengthwise passages in the roll shell. A cap at the opposite end of the roll shell has cross passages redirecting the fluid to adjacent lengthwise passages to return the fluid which may be redirected along the shell roll or be directed back through the middle race to the outlet of the rotary joint. Thus, the present invention permits taking full advantage of good temperature control and heat transmission of a so-called drilled roll in a shell type deflection control roll.

DESCRIPTION OF THE DRAWINGS

FIG. 3 is a section on line III—III of FIG. 1;

FIG. 4 is a section on line IV—IV of FIG. 1; and

FIG. 5 is a diagrammatic representation of the directions of flow of the temperature control fluid through the roll shell.

DESCRIPTION OF THE PREFERRED EMBODIMENTS

Figure 1:
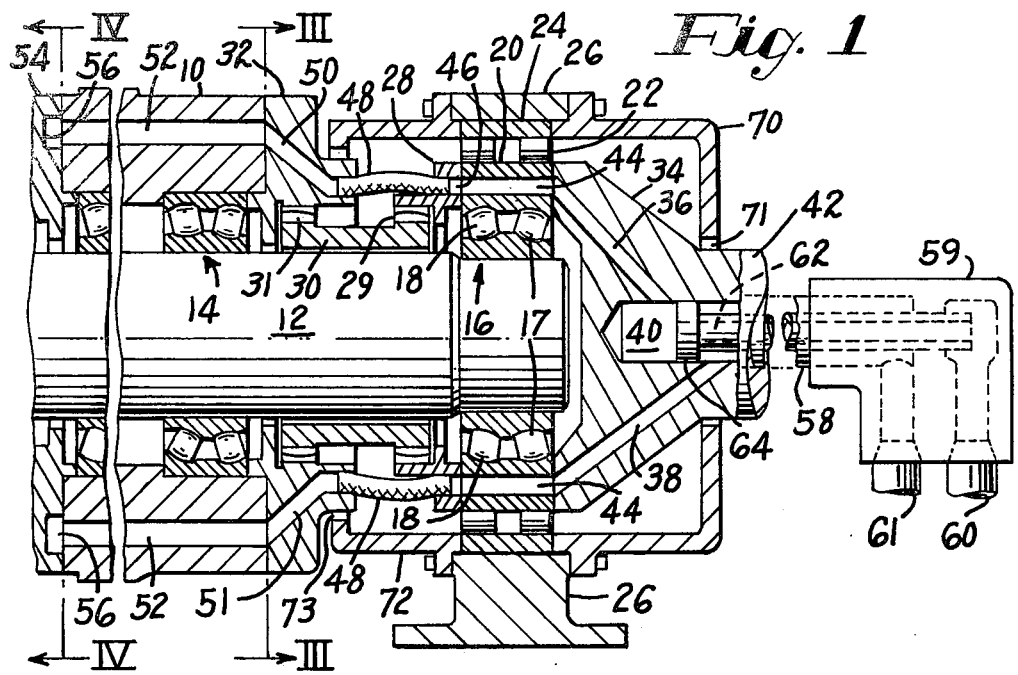
FIG. 1 is a side view in section through a shell type roll embodying the present invention.

Referring to the drawings, there is shown one end of a shell roll 10 which is mounted for rotation on a fixed shaft or beam 12 by spherical bearings 14 (only one shown). The beam 12 in turn is carried at its ends in spherical bearings 16 which permit the beam to bend in the manner seen in FIG. 2. The bearing 16 at one end of the roll assembly as seen in FIG. 1 is formed by an inner race 17, rollers 18 and a middle race 20. The middle race 20 in turn is mounted by rollers 22 in an outer race 24 received in a support 26. The middle race is provided with a flange 28 having internal teeth 29 which are connected by a spline 30 to internal teeth 31 of a cap 32 secured as by bolts 33 (FIG. 3) to one end of the roll shell 10. In this manner the roll shell 10 and the middle race 20 rotate in unison on the beam 12 in bearings 14 and 16 respectively. Other means of solid or flexible connection between the middle race and the roll shell could be provided without departing from the scope of the invention. The entire assembly is carried by the support 26 through rollers 22 and outer race 24. The support is shown in the form of a fixed pedestal but could also be part of a movable member used to move the roll assembly bodily without departing from the scope of the invention.

Figure 2:
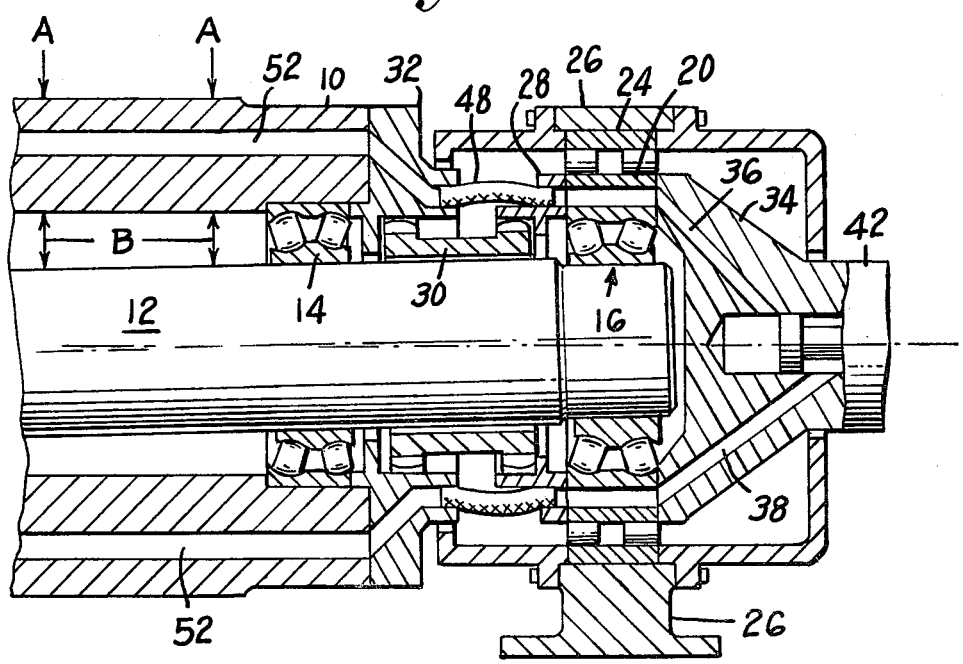
FIG. 2 is a view similar to FIG. 1 illustrating the deflection of the roll shell and bending of the fixed beam.

Up to this point the mechanism described is generally similar to that disclosed in U.S. Pat. Re. No. 27,445 to Kuehn. The shaft 18 of that patent (42 herein) is described as being a drive member but it is within the scope of the invention that the shaft may also be rotated freely from rotation of the roll shell otherwise caused. As seen in FIG. 2, the upper surface of the roll shell 10 is maintained substantially straight to provide a uniform nip pressure represented at the arrows A. Forces between the inner surface of the roll shell and the beam 12, represented by the arrows B maintain the shell substantially straight or in a uniform nip condition with deflection being accounted for by bending of the beam. The forces represented by the arrows B may be applied by a body of pressurized fluid as in the Appenzeller patent or by a plurality of pistons mounted in the beam with hydrostatic pads supporting the inner surface of the shell as disclosed in the Hold patent.

Referring again to FIG. 1, it may be seen that the middle race 20 has secured thereto an extension or cap 34 having an array of bores 36 and 38 which extend from a central bore 40 in a cylindrical portion 42 of the cap 34. The bores 36 and 38 lead to a circular array of conduits 44 which extend through the middle race 20. Holes 46 coextensive with the conduits 44 lead through the flange 28 and preferably are connected by flexible tubes 48 to a circular array of passages 50, 51 (see also FIG. 3) which lead through the cap 32 to certain ones of a circular array of passages 52 which extend lengthwise through the roll shell 10. Flexible solid means other than the flexible tubes could be used to provide communication between the conduits in the middle race and the passages in the roll shell without departing from the scope of the invention. An end cap 54 secured to the shell roll 10 by bolts 55 (FIG. 4) has grooves 56 which connect adjacent passages 52 at the opposite end of the shell 10. The central bore 40 receives a tube 58 on which is mounted a rotary joint 59 having an inlet pipe 60 and an outlet pipe 61. It should be obvious that the rotary joint may be provided by rotation of the tube either in the bore 40 or in the fitting 59 without departing from the scope of the invention. The tube 58 communicates with the outlet 61 and also receives a tube 62 of lesser diameter and having a head 64 providing a baffle which separates the bore 40 into two passages one leading from inlet 60, through tube 62 to passages 36; and the other leading from the outlet 61, the space between tubes 58 and 62 to the passages 38. Passages 36 lead through the inner race 50. Passages 38 also lead through the inner race and flexible tubes 48 to the passages 51.

Referring to FIG. 5 there may be seen a diagram illustrating the flow of temperature control fluid through the roll shell. As shown, fluid enters through inlet 60 and passes through the tube 62, passage 36 in the cap 34, conduit 44 in the inner race 20, through a hole 46 in the flange 28, through a flexible tube 48 and a passage 50 in cap 32 to one of the passages 52 in the roll shell. The fluid then passes via a groove 56 in cap 54 at the other end of the roll shell and through an adjacent passage 52 to the cap 32. The fluid may pass directly to a return passage 51 in cap 32 but preferably the fluid will be transferred via a groove 66 to another adjacent passage 52. At the other end the fluid will then be returned by another groove 56 in cap 54 through a passage 52 and then to a return passage 51. The fluid then is conducted through a flexible tube 48, a conduit 44 in the inner race 20 and via a return passage 38 in the cap 34 and via tube 58 to the outlet 61. The inlet and outlet may be connected to a wide variety of well known means suitable for controlling the temperature of the fluid for recirculation in an alternate passes through the roll shell passages.

In this manner it may be seen that temperature control fluid is fed to and from a deflectable roll shell which is amply supported for any load to be encountered by a triple race bearing. As shown in FIG. 1, the entire bearing and connecting unit is enclosed at one side in a lubrication containing housing 70 having suitable sealing means 71 through which the cylindrical portion 42 passes. At the other side of the bearing unit a housing 72 having a flexible sealing means 73 rides on a cylindrical portion of the cap 32 which may deflect relative to the housing according to bodily deflection of the roll shell 10. Obviously, the sealing means 73 may be formed by any one of well known types suitable to accommodate the extent of roll shell deflection. While not shown, any well known means may be used to rotate the roll shell through the cylindrical portion 42. Since the portion 42 is not subject to deflection and is amply supported in the triple race bearing, no problem of gear teeth misalignment would be encountered.

The above description is intended to be by way of explanation of a generally schematic arrangement of preferred embodiments and not by way of limitation of the invention. It should be understood that substitution of a wide variety of well known mechanisms can be provided in alternate forms without departing from the scope of the invention.

We claim:

1. In a shell type roll mounted for rotation about a non-rotatable beam received in the inner race of a triple race bearing, the middle race of the bearing being flexibly connected to the shell roll for rotation therewith under conditions of axial misalignment and the outer race of the bearing being carried by a support; the improvement comprising temperature control means for the shell roll including passages extending lengthwise in the shell roll adjacent its periphery, conduits extending through the middle race to a central axial bore in an extension of the middle race, flexible means connecting the passages and the conduits to accommodate conditions of misalignment between the middle race and the shell roll, and means including a rotary joint connecting portions of the central bore to an inlet and an outlet for circulating temperature control fluid through the roll passages.

2. Apparatus according to claim 1 in which the flexible means include flexible tubes extending between the conduits in the middle race and the passages in the roll shell.

3. Apparatus according to claim 1 in which a cap at one end of the shell roll connects certain adjacent passages and provides bores connecting other passages to the conduits in the middle race.

4. Apparatus according to claim 3 in which flexible tubes extend between the bores in the cap and the conduits in the middle race.

5. In a shell type roll mounted for rotation on a non-rotatable beam received in the inner race of a triple race bearing, the middle race of the bearing being flexibly connected to the shell roll for rotation therewith under conditions of axial misalignment and the outer race of the bearing being carried by a support, means acting between the beam and the shell roll whereby the shell roll is maintained in a substantially constant nip load condition along its length and the beam bends from the support provided by the inner race; the improvement comprising temperature control means for the shell roll including passages extending lengthwise in the shell roll adjacent its periphery, conduits extending through the middle race to a central axial bore in an extension of the middle race, flexible means connecting the passages and the conduits to accommodate conditions of misalignment between the middle race and the shell roll, and means including a rotary joint connecting portions of the central bore to an inlet and an outlet for circulating temperature control fluid through the roll passages.

6. Apparatus according to claim 5 in which the flexible means include flexible tubes extending between the conduits in the middle race and the passages in the roll shell to accommodate deflection movement of the roll shell relative to the middle race.

7. Apparatus according to claim 6 in which a cap at one end of the shell roll connects certain adjacent passages and provides bores connecting other passages to the flexible tubes leading to the conduits in the middle race.

8. Apparatus according to claim 5 in which the central bore receives part of the rotary joint and baffle means directing the fluid between the inlet and the outlet and selected conduits.

* * * * *